United States Patent [19]

Hall

[11] Patent Number: 5,187,794
[45] Date of Patent: Feb. 16, 1993

[54] SYSTEM FOR SIMULTANEOUSLY LOADING PROGRAM TO MASTER COMPUTER MEMORY DEVICES AND CORRESPONDING SLAVE COMPUTER MEMORY DEVICES

[75] Inventor: William A. Hall, Houston, Tex.

[73] Assignee: The United States of America as represented by the Administrator of the National Aeronautics and Space Administration, Washington, D.C.

[21] Appl. No.: 323,748

[22] Filed: Mar. 15, 1989

[51] Int. Cl.$^5$ .............................................. G06F 15/06
[52] U.S. Cl. ............................ 395/800; 364/DIG. 1; 364/229; 364/240; 364/243; 364/187; 395/500; 395/700; 371/16.1
[58] Field of Search ... 364/200 MS File, 900 MS File, 364/187; 395/500, 800, 700; 371/16.1

[56] References Cited

U.S. PATENT DOCUMENTS

| | | | |
|---|---|---|---|
| 4,180,860 | 12/1979 | Driscoll et al. | 364/900 |
| 4,368,514 | 1/1983 | Persaud et al. | 364/200 |
| 4,451,884 | 5/1984 | Keath et al. | 364/200 |
| 4,459,655 | 7/1984 | Willemin | 364/132 |
| 4,660,170 | 4/1987 | Hui et al. | 364/900 |
| 4,675,803 | 6/1987 | Kendall et al. | 364/131 |
| 4,700,292 | 10/1987 | Campanini | 364/200 |
| 4,862,350 | 8/1989 | Orr et al. | 364/200 |
| 4,876,643 | 10/1989 | McNeill et al. | 364/200 |
| 4,882,702 | 11/1989 | Struger et al. | 364/900 |
| 5,021,950 | 6/1991 | Nishikawa | 364/200 |

FOREIGN PATENT DOCUMENTS 0159548 3/1985 European Pat. Off.

Primary Examiner—Thomas C. Lee
Assistant Examiner—Mehmet Geckil
Attorney, Agent, or Firm—Hardie R. Barr; Guy M. Miller; Edward K. Fein

[57] ABSTRACT

A bus programmable slave module card 30 for use in a computer control system which comprises a master computer and one or more slave computer modules interfacing therewith by means of a bus and wherein each slave module includes its own microprocessor memory, and control program for acting as a single loop controller. The slave card includes a plurality of memory means corresponding to a like plurality of memory devices in the master computer, for each slave memory means its own communication lines connectable through the bus with memory communication lines of an associated memory device in the master computer, and a one-way electronic door which is switchable to either a closed condition or a one-way open condition. With the door closed, communication lines between master computer memory and slave memory are blocked. In the one-way open condition invention, the memory communication lines of each slave memory means connect with the memory communication lines of its associated memory device in the master computer, and the memory devices of the master computer and slave card are electrically parallel such that information seen by the master's memory is also seen by the slave's memory. The slave card is also connectable to a switch for electronically removing the slave microprocessor (45) from the system.

4 Claims, 10 Drawing Sheets

SYSTEM FOR SIMULTANEOUSLY LOADING PROGRAM TO MASTER COMPUTER MEMORY DEVICES AND CORRESPONDING SLAVE COMPUTER MEMORY DEVICES

ORIGIN OF THE INVENTION

The invention described herein was made in the performance of work under a NASA contract and is subject to the provisions of Sections 305 of the National Aeronautics and Space Act of 1958, Public Law 85-568 (72 Stat. 435; 42 U.S.C. 2457).

FIELD OF THE INVENTION

This invention relates to multi-microprocessor computer systems which comprise a master microprocessor and several slave microprocessors and more particularly to a bus programmable slave module.

BACKGROUND ART

Multi-microprocessor computer systems are frequently used for controlling industrial processes and many kinds of complex system operations. Such computer systems are typically master/slave systems wherein one microprocessor acts as the master which provides overall system control and bus arbitration and the other microprocessors act as responsive slaves for controlling specific functions. Each slave board contains its own control program and system components such that, except for data logging or setpoint changes in a database, it is able to function as a stand alone, single loop controller distributing the work load from one microprocessor to several microprocessors as necessary. This capability therefore allows for a modular development of a particular industrial system or project or alternatively, the simultaneous operation of several different systems or projects. In such systems, the flexibility of a slave board and how it may be utilized is restricted by the nature of the system, as being either hardware-dependent or software-dependent. In a hardware dependent system, the slave board closest to one end of the card cage has a higher priority than a slave card further away from that end of the card cage and gets most of the bus attention to the disadvantage of the slave card at the end of the priority chain which may have severe difficulty in obtaining required bus time. In a variation of the hardware dependent system, the slave is permitted to temporarily take control of the bus while freezing the master. However, this variation allows only one master and one slave per bus and should the slave need the bus frequently, the master may experience repercussions from the frequent interruptions. It is an advantage of hardware dependent systems, that since all bus arbitration is done in hardware, the programmer is freed from having to develop sophisticated master/slave bus protocol software, but a major disadvantage is that a particular manufacturer's slave boards will not work with those of another manufacturer.

The software dependent systems are characterized by the use of "windowing" techniques wherein a portion of the read-and-write memory, hereinafter referred to as the RAM, is allocated common to both the slave and the master. In one technique, the allocated RAM is part of the RAM used by the slave. The central processing unit or "CPU" of the master stops the slave CPU and then transfers a block of information into the slave's RAM area. The slave is then released and if its memory has been modified, the slave moves the new information block to an area of RAM not accessible by the master CPU. In a second technique, a dual part RAM chip is used as the bus interface, acting as a bus buffer and data transfer mechanism controlled by the slave. This technique provides maximum flexibility since all transactions take place via software but the software protocol is very involved to such degree that it is best written by the manufacturer and then purchased as a software routine to be added to a program. A further disadvantage evolves from the operating system of a microprocessor control, hereinafter referred to as "CP/M", in that there is a limited memory or RAM "window" in the normal memory map addresses which is accessible to a user for programs.

In either of those prior systems, it is not possible to load a program onto the slave card without assistance from the CPU and a considerable collection of specialized development equipment. To run any application program, it is required that the program first be stored in some kind of read-only-memory or ROM. Accordingly, such systems cannot handle dramatically different application program philosophies without changing either the hardware or reprogramming the read-only-memory by using external equipment such as a microprocessor development station and ROM programmers. Furthermore, to use a program on a master CPU requires another program for downloading a command or execute file and such serial downloading is very time consuming, typically several minutes.

Representative systems in the prior art which make evident these limitations are illustrated in U.S. Pat. Nos. 4,459,655 and 4,700,292 which disclose computer systems comprising master and slave microprocessors wherein external equipment such as ROM programmers, proprietary bus structures, and microprocessor development stations are required it if is desired to run an application program. U.S. Pat. No. 4,675,803 discloses a system with an interconnect processor coupled to a slave processor by a first bus and to an operator station by a second bus. While the slave processor may be reprogrammed by the interconnect, an application program must be stored in the erasable programmable read-only-memory (EPROM) or the non-volatile RAM and cannot be downloaded to the slave. U.S. Pat. No. 4,451,884 discloses a data processing system with a secondary subsystem containing processor and memory facilities separate from those of a primary subsystem and U.S. Pat. No. 4,180,860 discloses a universal module for controlling process instrumentation and including a dual mode microprocessor wherein a microprocessor can exchange data with a host station or a remotely located device.

SUMMARY OF THE INVENTION

The invention is a bus programmable slave module or card for use in a multi-processing computer control system comprising a master computer and one or more slave computer modules which interface therewith by means of a standard data communications bus, and wherein each of said slave computer modules includes its own microprocessor, volatile and non-volatile memory means, and a control program whereby it can act as a stand alone, single loop controller. The slave module card of the present invention is provided with a plurality of memory storage devices corresponding to a like plurality of memory storage devices in the master computer, for each of the slave memory storage devices its own set of memory communication lines connecting with the bus and connectable therethrough to the memory communication lines of an associated corresponding memory storage device in the master computer, and a one-way electronic door. The electronic door on said slave card is operable by an appropriate switch means to either a closed condition or a one-way open condition. In the closed condition of the door, the memory communication lines between the master computer and the slave memory devices are blocked and the master computer is effectively isolated from the slave card in the non-programming mode of operation of the multi-processing computer control system. In the one-way open condition of the door corresponding to the programming mode of operation wherein it is possible to program the bus programmable slave card of the invention, the memory communication lines of each slave memory storage device are in direct communication with the memory communication lines of its associated corresponding memory storage device in the master computer, and an electrical parallel connection exists between the memory storage devices of the master computer and the memory storage devices of the slave card such that any information seen by the master's memory devices is also seen by the slave's memory devices. The microprocessor of the slave card is also connectable to said switch means which is selectively operable to sever communications between the slave microprocessor and the slave memory storage means and thereby electronically remove the slave microprocessor from the system when the master computer and the slave module card are in their programming mode relationship. Accordingly, with the master computer and the slave module card in their programming mode relationship, a user may load an application program in the memory storage devices of the master computer and thereby accomplish a parallel loading of the program into the memory devices of the slave card.

DETAILED DESCRIPTION OF THE INVENTION

Figure 1:
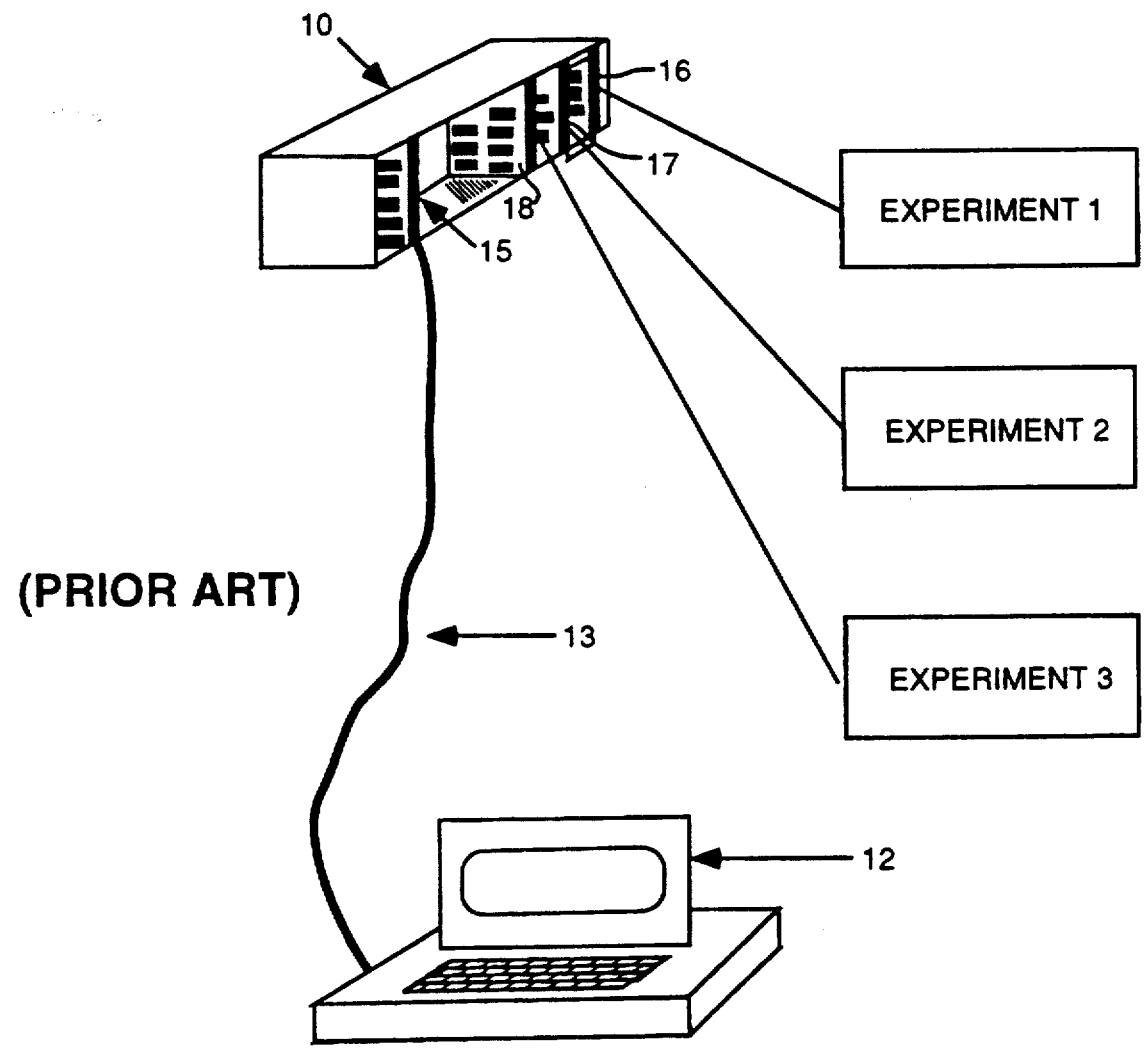
FIG. 1 is an illustration of a multi-processing computer installation which is typical of the prior art.

Referring more particularly to the drawings, there is shown in FIG. 1, a multi-processing computer 10 in a setup for controlling a multiplicity of experiments or projects, which might be any of a variety of processes or apparatuses for performing specific functions. By means of a terminal 12 and a connecting interface cable 13, a user may issue commands to the computer 10, typically a standard (STD) computer, which includes a master microprocessor module 15 and slave microprocessor modules 16, 17, 18 installed and interconnected therewith in a common chassis. There may be more or less of such slave microprocessor modules. Once the master and slave are programmed, a terminal is not necessary but can be used. Each microprocessor module includes its own CPU and microchips for an unalterable memory or ROM, and a volatile read-and-write memory or RAM. While the master microprocessor acts as a master/bus arbitrator, each slave microprocessor module contains its own control program and except for data logging or setpoint changes, acts as a single loop controller.

Figure 2:
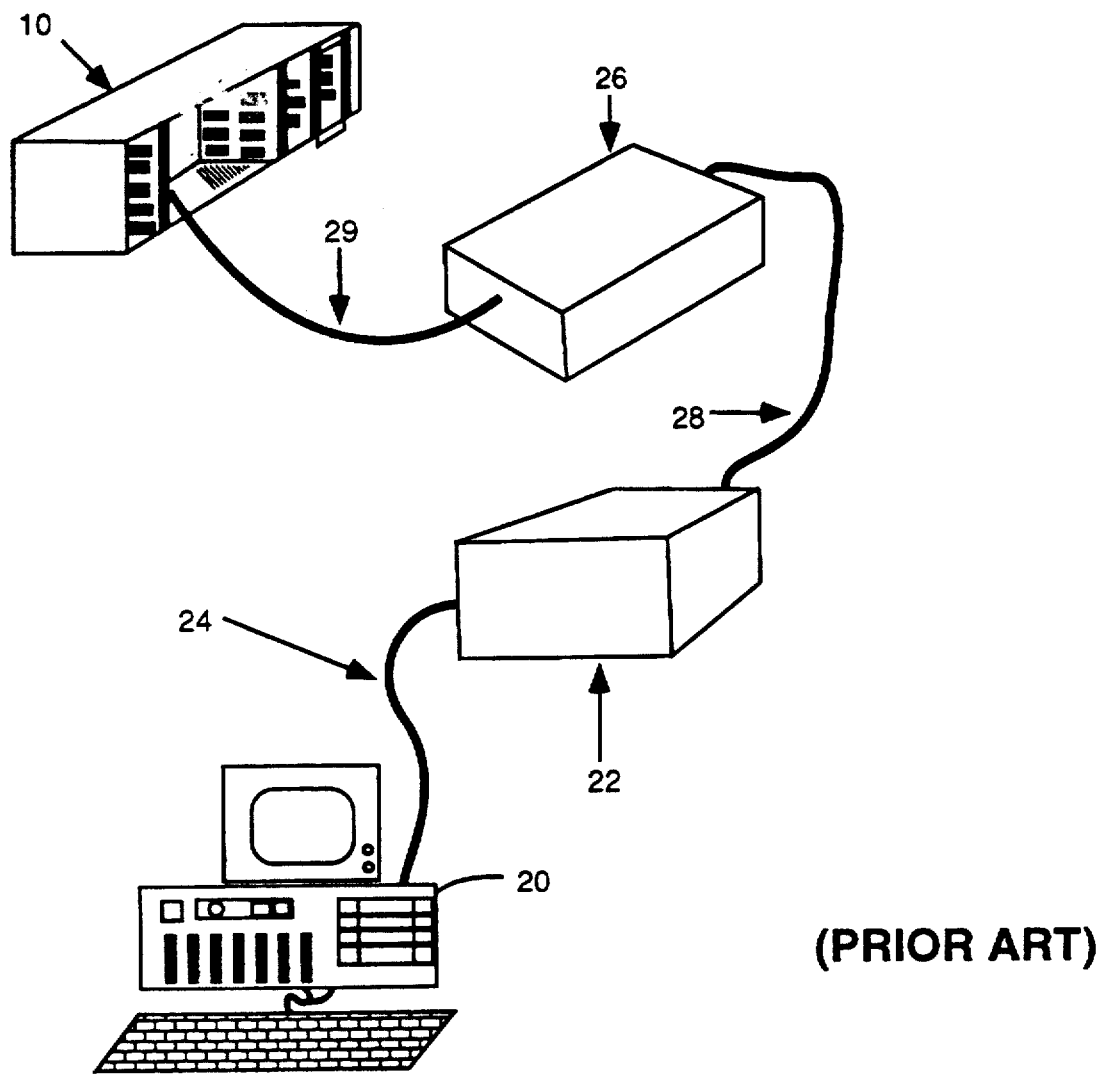
FIG. 2 is an illustration of an assembly of equipment which has been conventionally used for programming a slave module.

If it is desired to program a slave card, such as to reprogram or add an application program, an arrangement of equipment such as shown in FIG. 2 has heretofore been necessary. The programming setup requires a personal computer 20, a microprocessor development station 22 connected thereto by an RS 232 serial line 24, a microprocessor emulator 26 connected to the development station 22 by a ribbon cable 28 and to the multi-processing computer 10 by a similar connector cable 29. For this arrangement, the user unplugs the microprocessor from the particular target slave module and plugs in the emulator 26, whereby the emulator 26 and personal computer 20 can simulate the microprocessor which has been removed, with total control in the hands of the user. The user uploads the application program which has been written and cross-compiled on the personal computer 10 and uploads the result to the microprocessor development station 22. From there the development station runs the program on the target slave system. In addition to the undesired amount of time required for the loading of an execute file and an application program with such external equipment, the equipment itself, particularly the microprocessor development station 22 is expensive and it is very difficult, sometimes impossible, for the user to locate all the equipment in close enough proximity such that the emulator connector 29 can reach the slave module's CPU socket with a very short restricted maximum length of connector cable.

Figure 3:
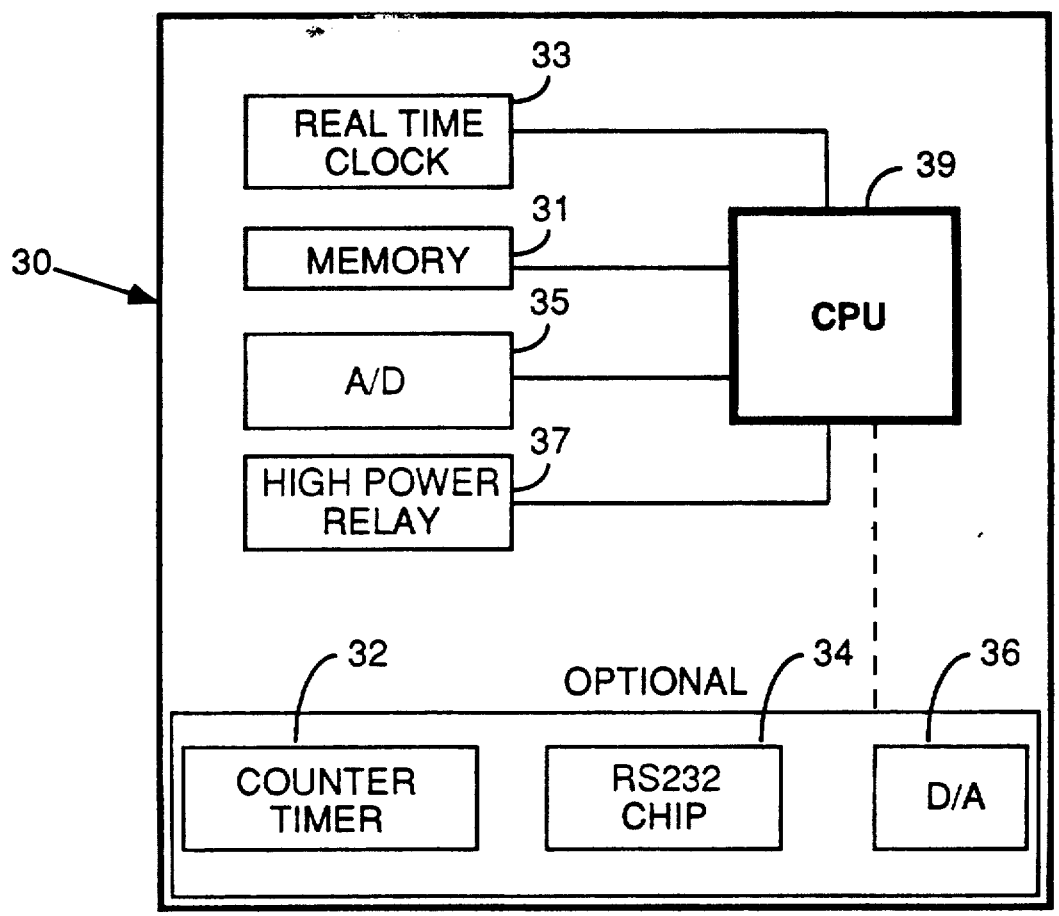
FIG. 3 is a schematic block diagram of the slave card of the present invention.
Figure 4:
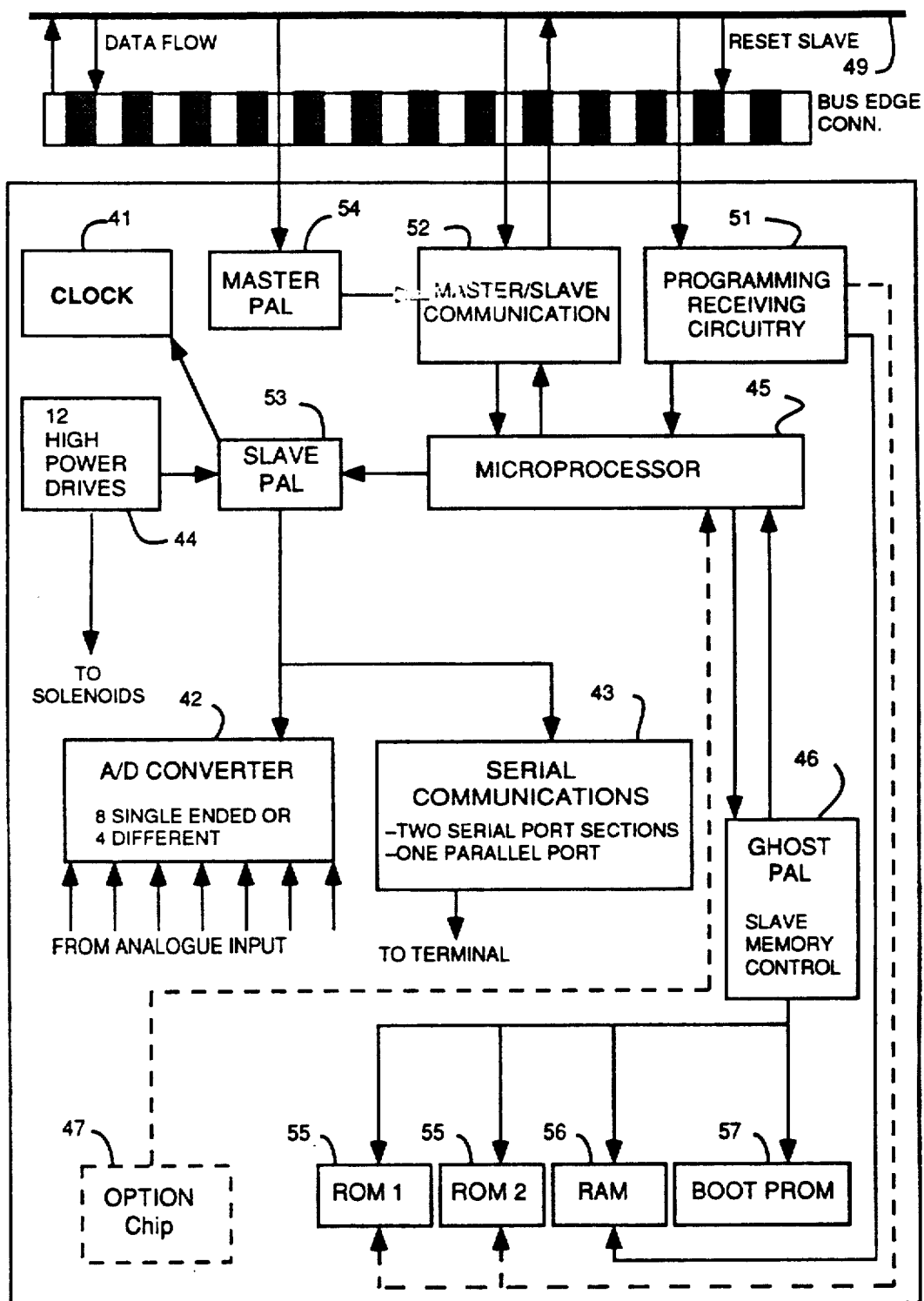
FIG. 4 is an illustration of a representative layout design for the slave card of the present invention.

The bus programmable slave card 30 of the present invention shown in its layout-configuration in FIG. 4 is designed to allow interactive, microprocessor based, single loop control with the ability to load and run a program from the STD bus without the need of a microprocessor development station and other specialized development equipment, thereby reducing capital costs for equipment, software development and testing, and reducing the time to load a program into a slave processor by several orders of magnitude. The base configuration of the card 30, showing principal components and their interconnection, is illustrated in FIG. 3. As shown therein, the card comprises 64 K bytes of memory 31; a real time clock 33 indicating year, month, day, hour, minutes, and seconds; four channels 35 for differential analog-to-digital conversion (or 8 channel single ended); twelve channels of high powered relay type devices 37; and a central processing unit 39 or CPU with master/slave bi-directional communication, and bus/slave programming capability. In addition, one of the following three options can be installed on the card:

a counter time 32, and RS232 chip 34 for providing a standard signal interface for terminal communication capability, or a digital-to-analog output chip 36.

A board layout for the card 30 utilizing one of the above options is shown in FIG. 4. As shown therein, the card 30 is provided with its own microprocessor 45, which is connected directly or indirectly to all other functional chips on the board, such as a programmed-array logic chip 46 or GHOST PAL which connects directly to the ROM 55 and RAM 56 memory chips for providing slave memory control. A boot PROM memory chip 57 for the bootstrapping process is also controlled by the GHOST PAL.

The microprocessor 45 is also in direct communication with an OPTION chip 47, selected from the three options noted above, namely a counter timer, RS 232 signal interface chip, or a digital-to-analog converter. It also receives programming information from the master's computer bus 49 through a programming receiving circuit 51 to which it is directly connected. When the programming receiving circuitry is used, the microprocessor 45 is electronically removed by a switch means as will hereinafter be described. A circuit 52 permitting two way master/slave communication between the microprocessor 45 and the master's computer bus 49 is also provided. In addition, through a programmed-array-logic chip 40 the microprocessor 45 communicates with a clock 41, an A/D converter 42, a serial communications chip 43 and a plurality of high powered relay chips 44 for solenoid operation to control such functions as fluid flow, etc.

The bus programmable slave card 30 offers two modes of operation. The first is the general run operation which characterizes the standard state the card will be in for most operations. The second is the programming mode, which deals with activities involved in programming the card from the STD bus.

Figure 5:
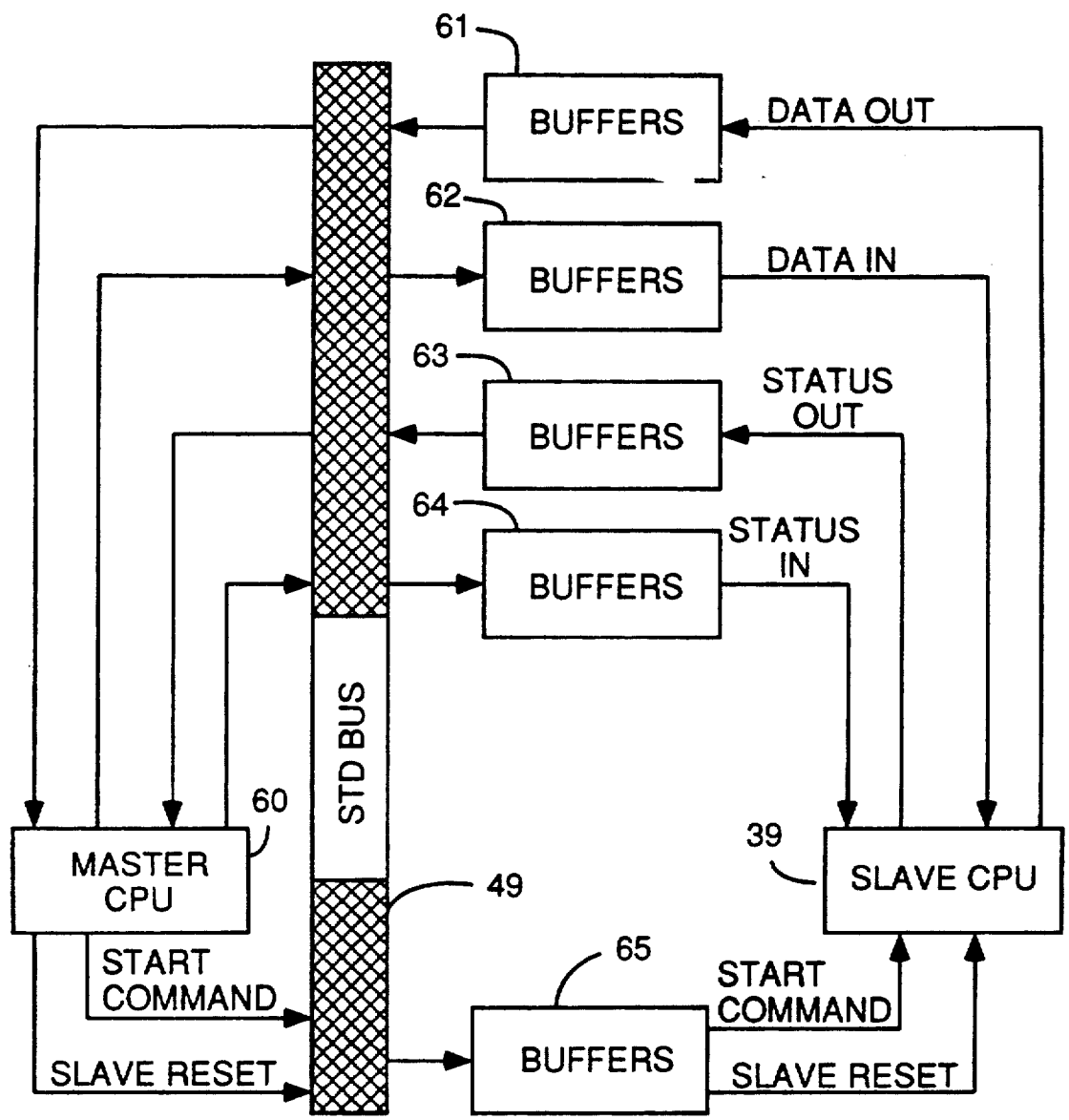
FIG. 5 is a schematic block diagram which illustrates the standard state of the slave card of the invention when operating in the general run mode.

In the general run mode as illustrated schematically in FIG. 5, the slave card acts as a single loop slave processor to the master CPU. As a slave, it never gets on the STD bus. The card is totally self sufficient and is capable of running its own input/output functions as well as data transfers to and from the STD bus via the master.

It will be seen in FIG. 5, that the slave's CPU 39 is in two-way communication with the master CPU through the bus 49 and temporary data storage buffers 61–64 for receiving or outputting status and data information. It also receives start command signals and slave reset signals from the master CPU through the bus 49 and buffers 65.

Figure 6:
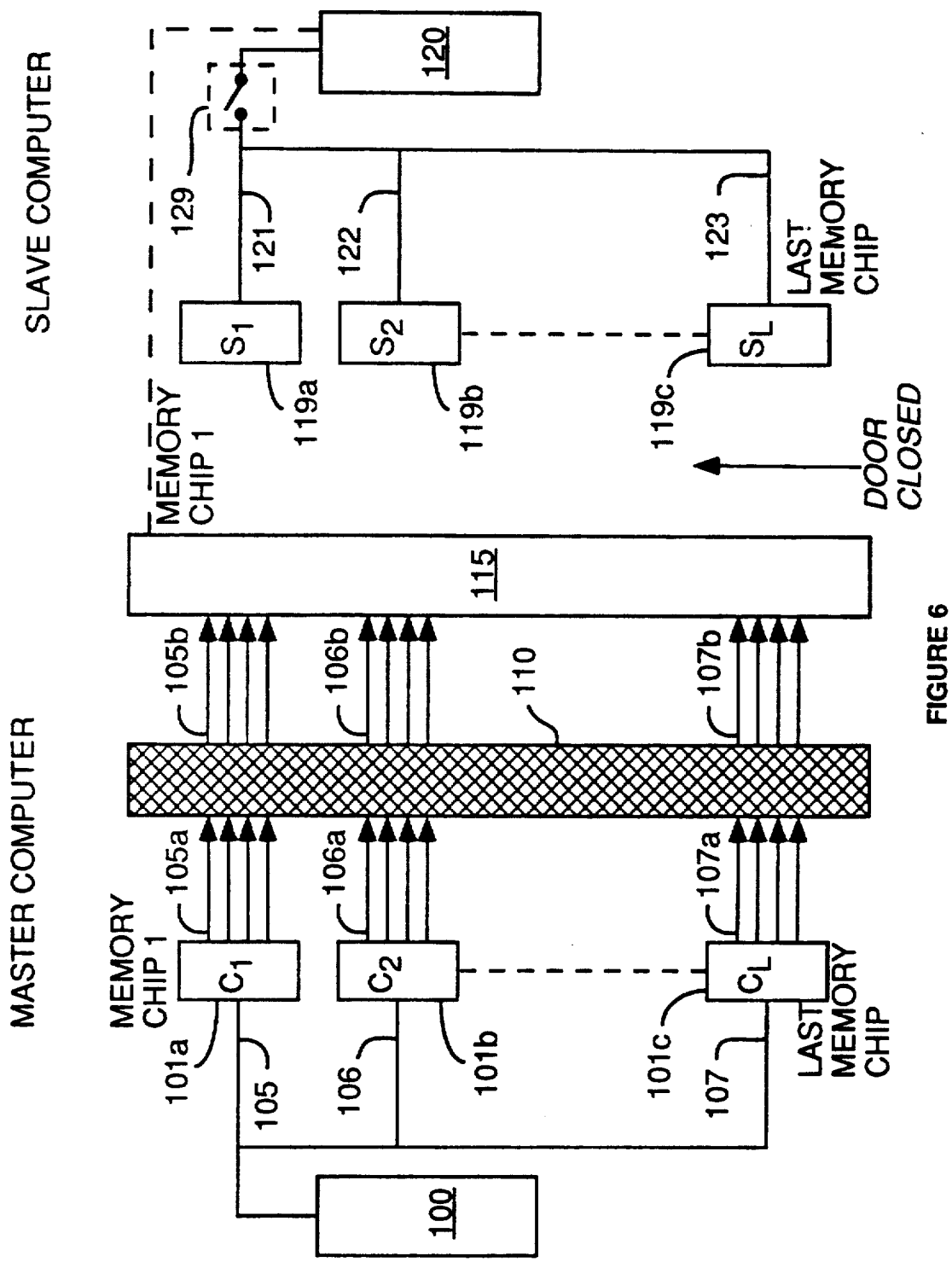
FIG. 6 is a schematic block diagram which illustrates the relationship of the master and slave in a non-programming mode of operation which uses the bus programmable slave card of the present invention.
Figure 7:
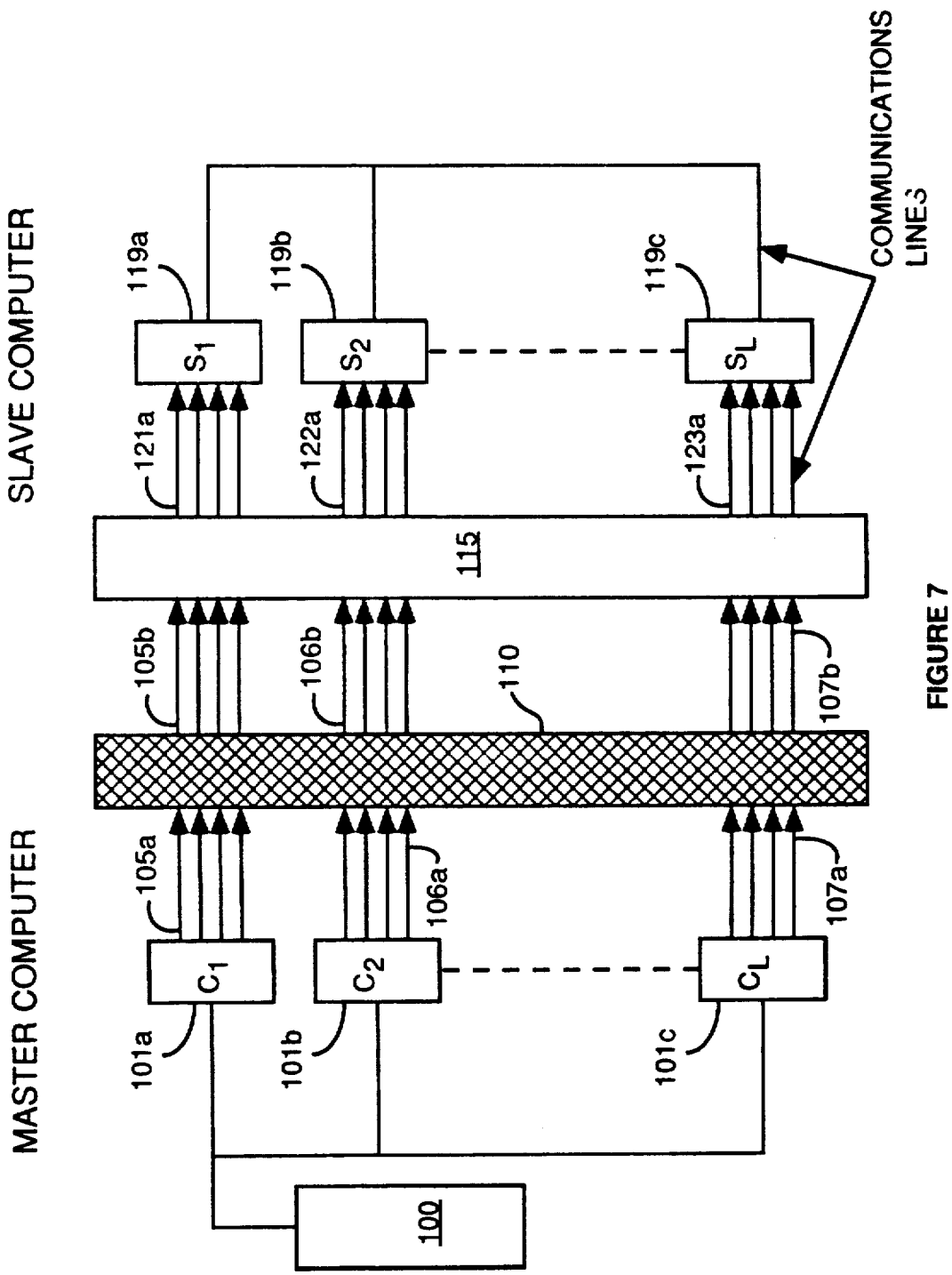
FIG. 7 is a schematic illustration of the relationship of the master and slave when using the slave card of the present invention similar to FIG. 6, but showing the programming mode of operation.
Figure 8:
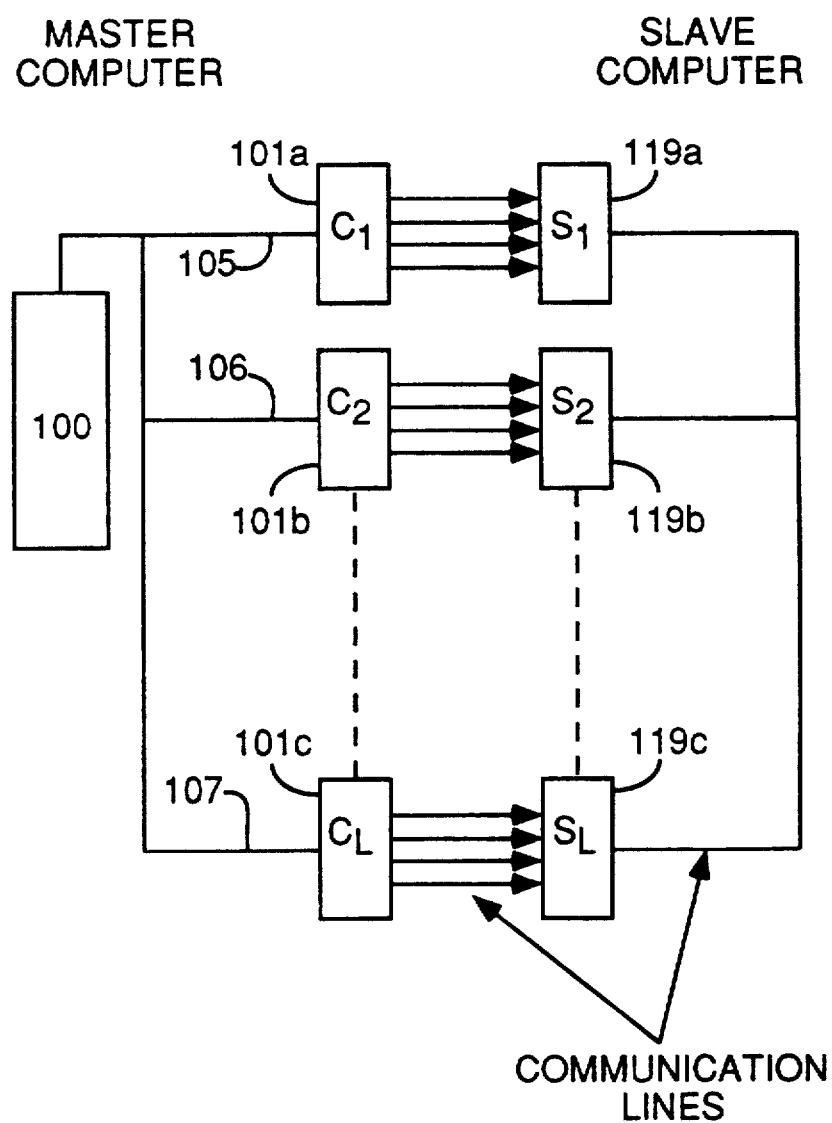
FIG. 8 is a schematic diagram similar to FIG. 7 depicting the relationship of master and slave when in the programming mode and illustrating the parallel loading of memory.

The interrelationship of the master computer card and a slave computer card is illustrated schematically in FIGS. 6, 7 and 8. As shown in FIG. 6, the master and slave microprocessor cards are joined by a common electronic bus, yet separated by an electronic door 115 comprised of electronic parts conventionally referred to as tri-state drivers. In the master computer, the memory chip C1 101a is connected to the microprocessor 100 by communication lines 105, and to the bus 110 by memory communication lines 105a. Through the bus 110, its memory communication lines 105a are also connected to the electronic door 115 by communication lines 105b. Similarly, chip C2 101b is connected by communication lines 106, 106a, and 106b to the microprocessor 100, bus 110, and the electronic door 115, respectively, and chip C3 101c is connected by communication lines 107, 107a, and 107b to microprocessor 100, bus 110, and electronic door 115. In the non-programming mode, the tri-state drivers of the door 115 are placed in a state such that the door 115 is closed and the memory communication lines from the master can not pass through to the slave thereby placing the cards in functional isolation from one another.

In the programming mode, shown in FIG. 7, the slave's microprocessor 120 is electronically removed from the slave board by operation of a toggle switch 129 to the closed condition. If desired, the switch 129 could be in the form of an electronic switch adapted to be operationally controlled by the master computer. In addition, the electronic door 115 normally included in the programming receiving circuitry is opened by the electronic removal of the microprocessor 120 which electronically place the tri-state drivers in a conducting state, thereby establishing connection of the communication lines 105b from the master's first memory chip with communication lines 121a between the electronic door 115 and the slave's first memory chip 119a, and similar connections from the master's second memory chip with the slaves second memory chip 119b, and so on for the rest of the memory chips including the slave's last memory chip 119c, as by connection of communication lines 106b with connection lines 122a, and communication lines 107b with communication lines 123a. In this way, all of the slave's memory chips are put in direct parallel with the master's memory chips and as a result, any information seen by the master's memory chips is also seen by the slave's memory chips. This parallel connection relationship is shown more clearly in FIG. 8 wherein the common bus 110 and the electronic door 115 are omitted.

It will therefore be seen from FIGS. 5 through FIG. 8, that all data and status information can be latched-in using tri-state buffers. In addition, the master can reset the slave card at will. If the slave is reset, then it will idle, waiting for a start program execution command from the master card. The slave card 30 does not require any modification to the operating system and gives the user 64 k worth of programming space. This 64 k can be configured as either EPROM or RAM in 8 k blocks by a simple jumper selection without changing out chips or using outside voltage sources.

The way in which the bus programmable slave card of the present invention is programmed is its most significant advantage, particularly when contrasted with the methods of programming slave modules in the prior art. Prior art systems utilizing programming by the master, are centered around using a small amount of memory for programming instead of the entire memory as in the slave card of the invention. As result, a program is loaded in small sections at a time by the master microprocessor and then moved by the slave microprocessor to another part of the slave's memory.

Figure 9:
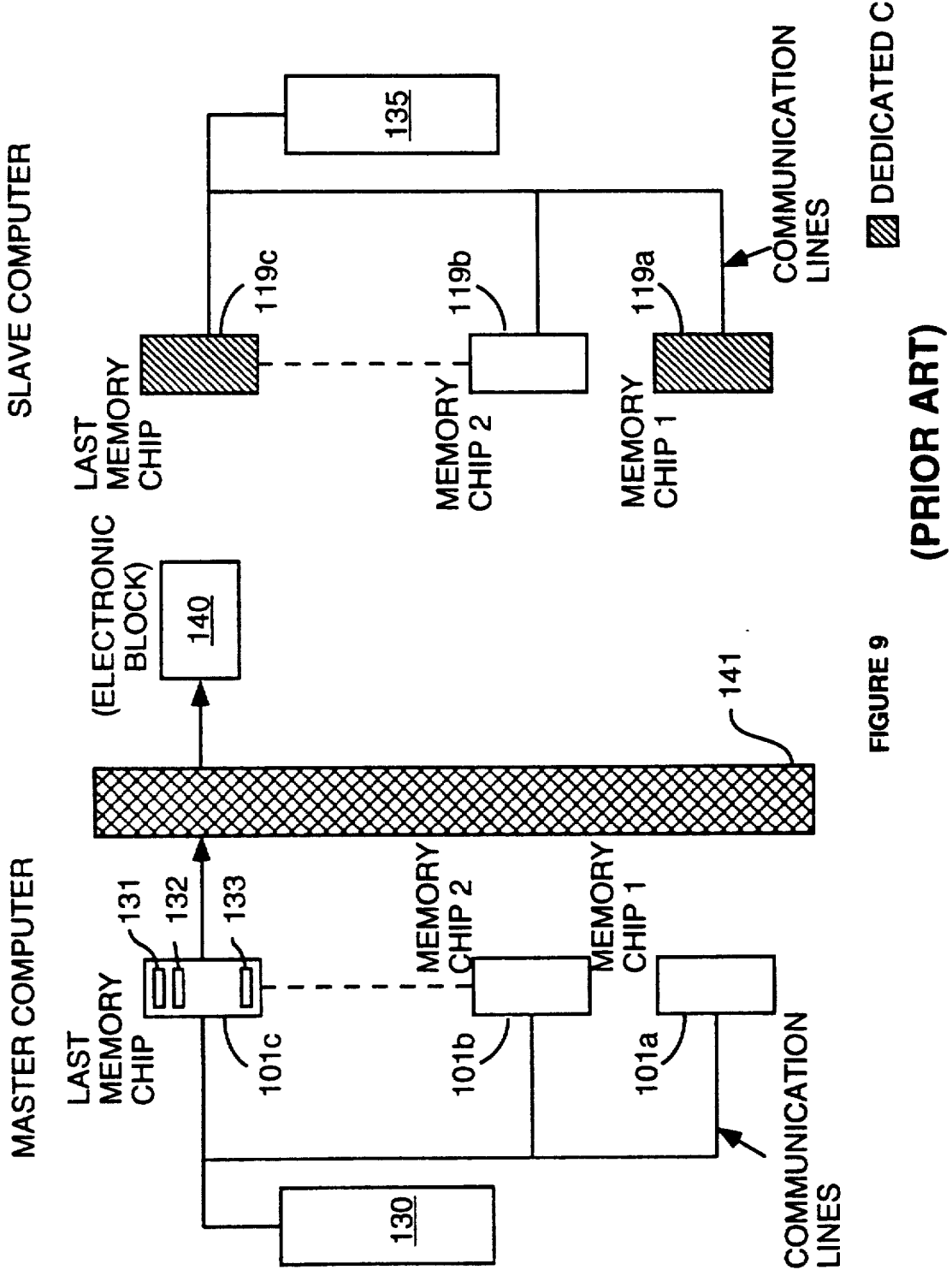
FIG. 9 is a schematic block diagram for a prior art system illustrating the relationship of the master and slave in the normal routine non-programming mode of operation.

In all cases the prior art systems will cover only a portion of their total memory with an electronic door, such as the one-way door 140 in the prior art system shown schematically in FIG. 9. Procedurally, the first memory chip in the master computer, and possibly others, is loaded with software dedicated just to master/slave bus arbitration and the transferring of data from the last memory chip to another memory other than memory chip 1. Depending on the type of actual master microprocessor 130 used, the last memory chip is used only as a mailbox drop off point and includes in simplest form two mail boxes 131, 132 and a temporary data storage area 133. The slave microprocessor 135 will write a special code to one of the two mailboxes wherein writing to the second mailbox is reserved for the master although either microprocessor can read all mailboxes. The slave processor 135 will periodically read its assigned mailbox to see if it can read back the special code that it stored there. If it finally does read that code, it then reads the master's mailbox to see if the master left a message saying that data has been left and the slave needs to transfer it out of the last memory chip before new data can be transferred in. If a message was left, it then goes to an assigned area in memory on the last memory chip and moves data from that area to some other memory chip, other than memory chip 1.

Figure 10:
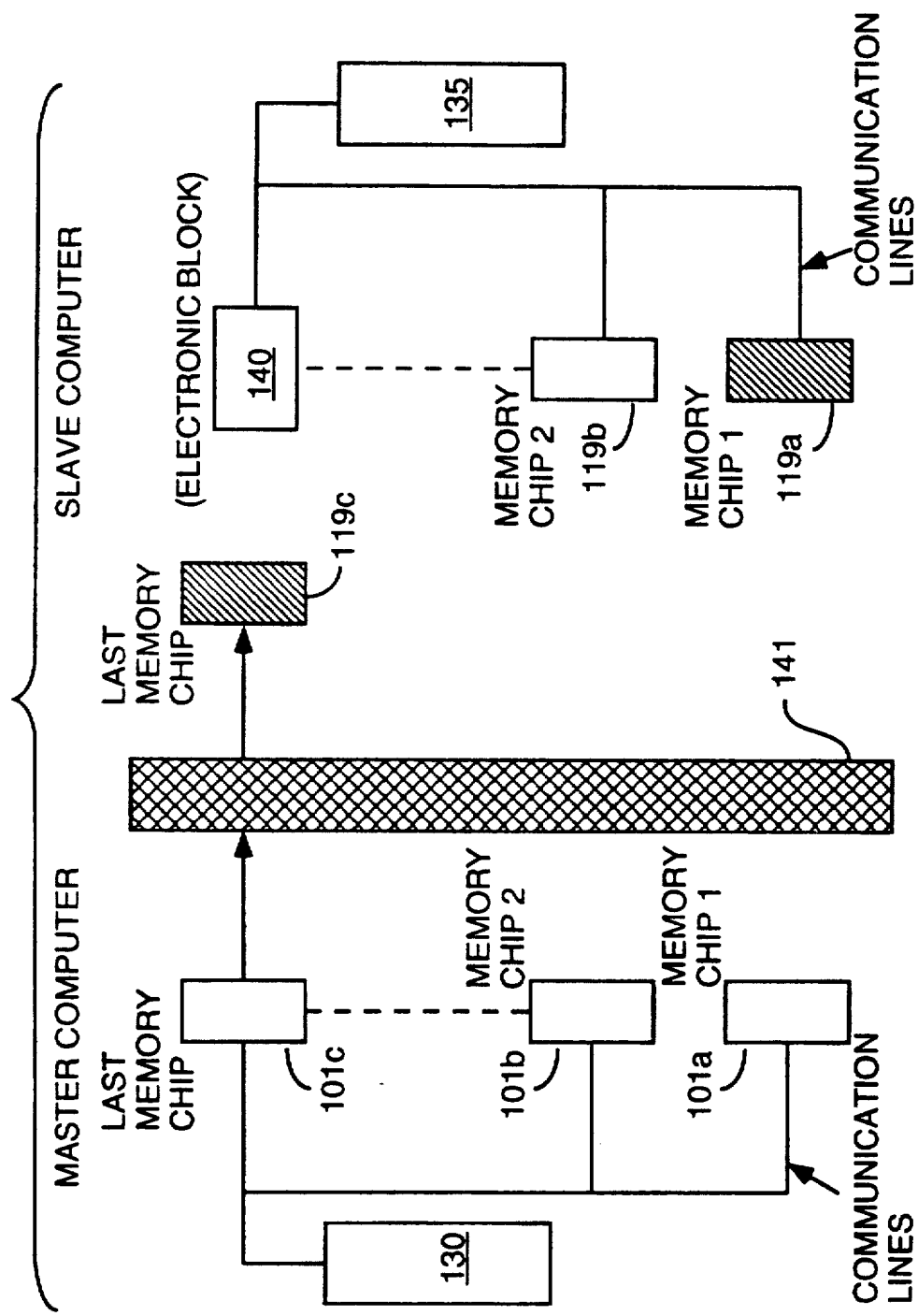
FIG. 10 is a schematic diagram for a prior art system depicting relationship of the master and the slave when operating a program routine.

There will be extensive additional electronic circuitry involved to handle proper bus arbitration for use of the common bus 141 and which microprocessor (master or slave) gets to talk to the last memory chip and when. In the programming mode, illustrated in FIG. 10, the master microprocessor electronically removes the last memory chip 119c from the slave's memory and makes it a part of its own memory. It then copies the necessary information onto this newly acquired memory chip, leaving a message in its assigned mailbox signifying that it has left new information for the slave microprocessor, and then gives it back to the slave. The slave microprocessor continues to scan for its special code that it placed in its mailbox. While the master has control of that last memory chip, the slave will not be able to read its special code and thus know that the chip is off line. When the memory chip is transferred back to the slave, the slave will again be able to read its special code and then check the master's mailbox for status on new data. If it finds that new data is available, it transfers that data from the last memory chip to some other memory chip that is not accessible by the master. This process is repeated until all of the required information has been transferred.

It will therefore be seen that by means of the unique bus programmable slave card of the present invention, the personal computer, microprocessor development station, emulator and cable are not required to program the slave card. In the programming mode the user flips a switch, sending the slave into tri-state suspension while its memory is imaged to the STD bus. At this stage, the user loads the application program into the master's memory. Once the program is loaded, the switch is closed and the slave is released. The master CPU is free to exit DDT and continue other activities. The slave card can be programmed with a 16 k .com file in less than 4 seconds compared to more than 13 minutes using serial loading methods. Once loaded, the program can then be treated as either RAM or ROM depending on jumper selection. At this point the slave will monitor the status port for a command to start program execution. It will loop endlessly until it receives that command.

It is also to be noted that a significant difference between the slave card of the invention and the prior art devices is that the master/slave bus interface design of the invention is based on the internationally accepted STD (Standard Bus) card system and can be both controlled and programmed by any STD computer system conforming to STD standards without the use of external equipment such as microprocessor development stations with emulators or ROM (Read Only Memory) programmers. In addition, the said program can be loaded onto the slave card of the invention into volatile RAM (Random Access Memory), without any assistance from its CPU, and run without any part of the application program first having to be stored in some kind of ROM. Because of this unique feature (loading of an application program without any assistance from the slave CPU), the slave card of the invention can accept and run dramatically different application program philosophies without touching or changing any component thereon. These application programs can include commercial programs so long as they do not require a floppy disk. Furthermore, this card will run commercial programs which require a standard CPM operating system.

While the foregoing description of the invention has been presented for purpose of illustration and explanation, it is to understood that it is not intended to limit the invention to the precise form disclosed. For example, the particular layout and configuration for the slave card of the invention can be other than shown in FIG. 4 as by adding or reducing memory chips, or other functional chips. Electronic switches other than mechanical switches 129 and 131 might also be provided. It is to be appreciated therefore, that various structural changes may be made by those skilled in the art without departing from the spirit of the invention.

I claim:

1. A multi-processing computer system comprising:
  a master computer having memory means comprising a plurality of memory storage devices;
  at least one slave computer each slave computer further comprising:
    a microprocessor;
    slave memory means comprising a plurality of slave memory storage devices corresponding in number to the plurality of memory storage devices in said master computer and electrically connected with said microprocessor;
    memory communication means for connecting each said slave memory storage device with a corresponding one of the plurality of memory storage devices in the master computer;
    electronic door means associated with said memory communication means for effecting a first closed condition wherein said memory communication means are blocked and a second one-way open condition wherein each slave memory device is connected with its corresponding memory storage device in the master computer;
    switching means for selecting either said first closed condition or said second one-way open condition and electronically removing said electrical connection between said microprocessor and said slave memory means
    whereby upon operation of said switch means to place the electronic door in said second one-way open condition and to remove said microprocessor from electrical connection with said slave memory means, loading a program into said memory storage devices of the master computer also accomplishes simultaneous loading of the program into said slave memory means.

2. The multi-processing computer system as set forth in claim 1 wherein said electronic door comprises a plurality of tri-state electronic devices, each of which is operably connected to one of said slave memory devices and to one of said master computer memory storage devices, and said tri-state devices are controllable by said switch means to said first closed condition wherein the memory connection means of each said pair are blocked and said second one-way open condition wherein the slave memory means and the master computer memory storage of each said pair are connected in one-way communication whereby information input to the master computer memory storage devices are input to said slave memory means.

3. The multi-processing computer system as set forth in claim 1 wherein said plurality of slave memory storage devices are a part of the volatile memory or RAM of said slave computer.

4. The multi-processing computer system as set forth in claim 1 wherein said plurality of memory storage devices are a part of the non-volatile read-only-memory of said slave computer.

* * * * *